April 20, 1965 V. J. READDY 3,179,478
BALL BEARING AND RETAINER THEREFOR
Filed Feb. 11, 1963 2 Sheets-Sheet 1

FIG. I.

INVENTOR.
VINCENT J. READDY
BY *Jack Larsen*
ATTORNEY

April 20, 1965  V. J. READDY  3,179,478
BALL BEARING AND RETAINER THEREFOR
Filed Feb. 11, 1963  2 Sheets-Sheet 2

INVENTOR.
VINCENT J. READDY
BY Jack Larsen
ATTORNEY

United States Patent Office 3,179,478
Patented Apr. 20, 1965

3,179,478
BALL BEARING AND RETAINER THEREFOR
Vincent J. Readdy, Plymouth, Mass., assignor to Massachusetts Institute of Technology, Cambridge, Mass., a corporation of Massachusetts
Filed Feb. 11, 1963, Ser. No. 257,453
8 Claims. (Cl. 308—187)

This invention relates to ball bearings, and more specifically to an improved race-guided ball retainer which retains a lubricant in the bearing over a long period of operation, without lubricant migration.

In inertial guidance systems and various other precision mechanisms with rotating parts, precision in bearings is vital. Where ball bearings are used, proper lubrication is important in order to cut down bearing friction.

In the spin-axis bearings of a gyroscope, such friction affects gyroscope precession rate. However, the presence of excess lubricant can also result in mass shift which introduces errors in the gyroscope system. The prior art expedients in retainers designed to lubricate spin axis bearings properly and to prevent mass shift of the lubricant are not wholly satisfactory because the retainers are not suited to precision fabrication, and therefore lack uniformity; moreover, they do not prevent some eventual lubricant migration.

Patent 3,027,626 to J. J. Murphy issued April 3, 1962, shows one such expedient in retainers for precision bearings which is the use of porous materials which are impregnated with lubricant in various ways. However, once the lubricant is released from these materials it eventually causes some mass shift. Also, the materials used in these prior-art retainers do not lend themselves to machining to precision tolerances, where this is necessary.

Furthermore, neither commercial standard ball bearing retainers, nor the use of a full complement of balls is suitable for uses where oil migration is an important consideration.

The primary object of this invention is to provide precision ball bearings with long running lives. Another object of this invention is to provide bearing assemblies which inherently maintain a high degree of symmetry and balance. A feature of this invention is a ball bearing retainer ring which may be machined accurately. Another feature of this invention is a ball-bearing retainer ring which prevents lubricant migration. Other and further objects and features of the invention will appear from the following description.

Figure 1:
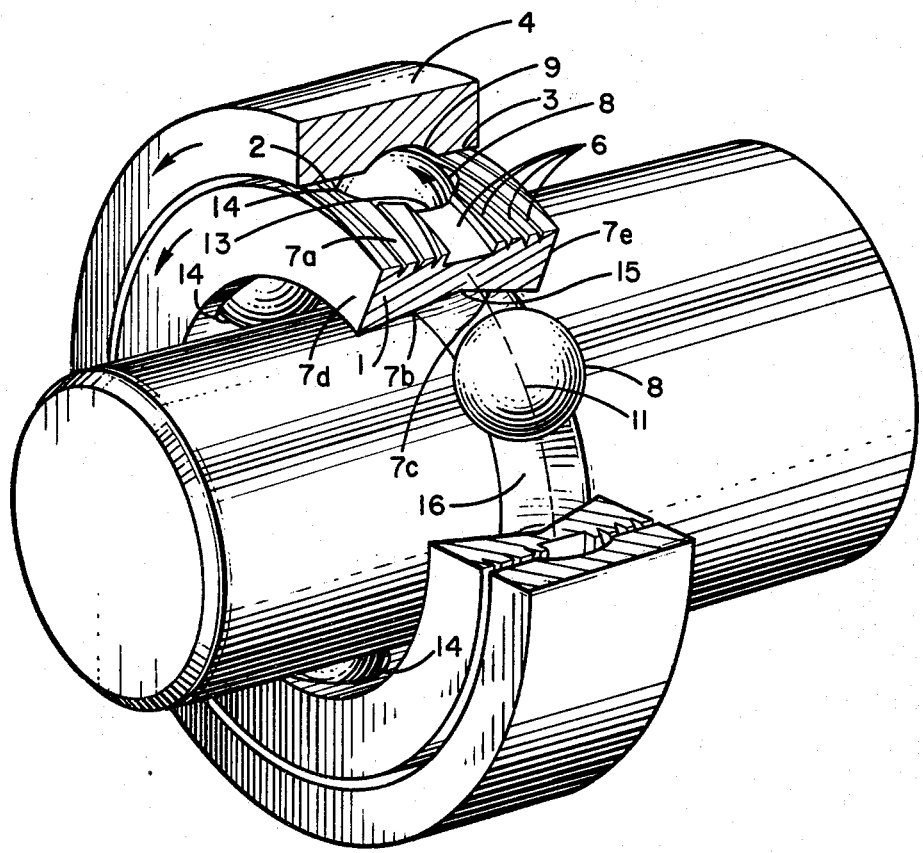
Figure 2:
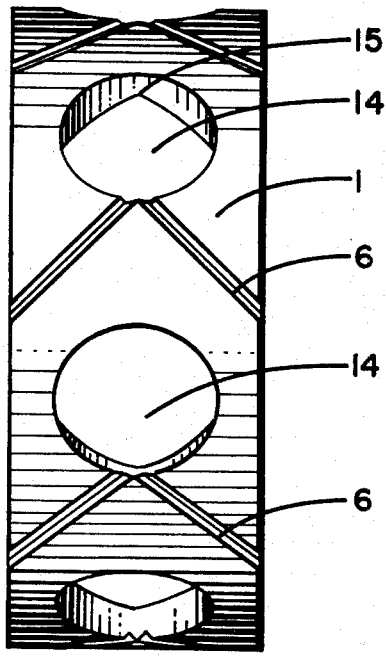
Figure 3:
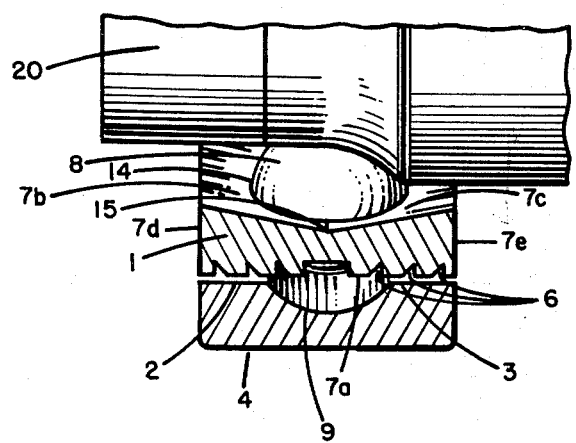

In general, this invention contemplates the fabrication from metal or some other suitable material of a ball bearing retainer ring of unique configuration, as shown in the accompanying drawings, of which:

FIG. 1 is a perspective view of the invention as embodied in a race-guided retainer ring, FIG. 2 is a view of an alternative embodiment of the novel retainer, FIG. 3 is a cross-sectional view of the invention of FIG. 1 showing further details of the inside and outside configuration of this retainer.

Referring now to FIG. 1, the invention is embodied in a combination of a retainer ring 1 working in conjunction with guiding lands 2 and 3 of outer race 4. The bearing must be unidirectional in order to utilize this invention.

With oil control grooves 6 pitched as shown, the proper relative motion between the outer race 4 and the retainer 1 is as indicated by the arrows. Generally, relative to the outer race, the retainer rotates at half its speed. The retainer is guided by and runs on a film (not shown) of oil between it and the outer-race lands 2 and 3. The centers of the balls 8 follow a circular track 11, the diameter of which is called the ball pitch diameter. The inside diameter of the retainer 1 as shown is slightly less than the ball pitch diameter. Alternatively, it may be made slightly greater. Rotation of the bearing in the opposite direction requires that the grooves 6 be oppositely slanted, i.e., the retainer must be turned end to end. Oil is retained on surfaces 7a, 7b, 7c of the retainer by roughness which may be imparted by vapor blasting or acid etching. The end surfaces 7d and 7e of the retainer are polished to prevent oil from running onto them from the roughened surfaces 7a, 7b, 7c. The bearing is lubricated by a small, measured quantity of oil placed on the balls 8 at assembly. In operation, oil carried by the balls 8 is deposited on the outer-race ball groove 9 and tends to remain there through the action of centrifugal force. Some of this oil is forced back out of the ball groove 9 by the action of the balls 8 running in ball groove 9 and is deposited on the surface of the outer race lands 2 and 3. The slanted oil control grooves 6 on the outer surface 7a of the retainer capture the excess oil not required for oil film lubrication of the interface of the retainer and the outer race land 2 and 3; and return it to the ball groove 9.

Centrifugal force resolved on the sloped inner surfaces 7b and 7c and the polished finish of the end surfaces 7d and 7e of the retainer prevents oil from migrating from the inner surfaces 7b and 7c across the end surface 7d and 7e. Capillary action, plus the angle of the oil-control grooves 6, in conjunction with the wiping motion of retainer 1 on the outer race lands 2 and 3 move the oil in the oil-control grooves 6 to the intersection of the grooves 6 and the retainer ball pocket 14. Each ball in its rotation alternately pushes and loses contact with the retainer due to the remaining irregularities in the races. As the ball 8 bumps the leading side of the ball pocket 14, it picks up oil and carries the oil on the surface of the ball through the ball pocket 14 to the oil reservoir 15. Some oil is deposited in the reservoir ahead of the ball and some is carried all the way around to the reservoir behind the ball, thereby lubricating the inner ball groove 16, and some goes back to the outer race. The V shape of the oil reservoir 15 and centrifugal force keep any oil which is delivered by the balls confined to the medial portion of the reservoir 15. During operation, the rotating ball 8 acts as a pump adding to and removing oil from the reservoir 15. This is controlled by the wiping action of the ball 8 running against the ball pocket 14. The ball pocket 14 diameter closely fits the diameter of the ball 8. Consequently, a thin film of oil from the reservoir 15 is spread over a large area of the ball as it rotates in the pocket. This assumes full lubrication of the outer race ball groove 5. The oil circulation as described is then repeated. For example, using the bearing as one of a pair on a shaft to support a gyro rotor at 16,000 r.p.m., with an axial preload of 1 pound and a retainer of .172" inside diameter and .250" outside diameter and a .100" in width, havng 7 ball pockets of .0625" diameter equispaced about the circumference of the retainer, the retainer will operate with oil return grooves at 45° to the center line when the bearing is lubricated with .001 gm. of Teresso V–78 oil and maintained at 125° F. The outer race curvature is 57% of the ball diameter, and the shaft curvature is 52% of the ball diameter. The angle of contact between the balls and the inner race is 27° from the perpendicular to the shaft. The clearance between the retainer and the outer race lands is .0025" ±.0005".

The V–78 oil used is made from paraffinic base stock, and is of the straight mineral oil type. It has gravity A.P.I. of 28.7; viscosity in S.S.U. at 100° F. of 656, carbon reserve of .30%; S.A.E. (motor div.) #40; and specific heat of .53 cal./gram–° C. It is contemplated that the retainer be fabricated from magnesium metal which is anodized after fabrication and machining.

It is to be understood that this invention may also be made with oil control grooves cut at various angles to the center line of the retainer, as shown in FIG. 2. Further, if the outer race lands are of unequal diameter, the groove pitch on either side of the retainer will be correspondingly unequal. FIG. 3 shows a cross section of the bearing and retainer ring of FIG. 1. The retainer is a ring of polygonal cross-section, the outer side 7a of the ring being straight except for the oil control grooves 6; the sides 7b and 7c are straight, substantially perpendicular to side 7a, and polished; the inside surfaces 7d and 7e form a V pointed toward the first side 7a. Radial, cylindrical holes 14 are distributed symmetrically about the circumference of the retainer ring 1 to serve as ball pockets. The configuration of shaft 20 is such that the bearing may be mounted easily from the thinner end. Other variations and arrangements of the elements of the invention will be apparent to one skilled in the art without departing from the spirit of the invention as defined by the appended claims.

The invention having thus been described, what is claimed is:

1. In a ball bearing of the form wherein a plurality of balls is constrained by a retainer ring to rotate on a circular track between inner and outer ball races, said outer ball race having a groove conforming to the contour of said balls, and on either side of said groove a land upon which said retainer ring rides by hydrodynamic lubrication; said balls being maintained in spaced apart alignment by a plurality of ball pockets around the circumference of said ring; an improved retainer characterized in that its outer-most portion is modified by spiral grooves directed toward the ball path in the direction of rotation of said retainer ring and proportinoed to generate hydraulic forces sufficient to overcome the centrifugal migration of oil in said bearing, and further characterized in that the inner surface of said retainer is of greatest diameter in the plane of said ball path sloping to lesser diameters at the ends of said retainer.

2. In a ball bearing for unidirectional operation, of the type wherein a complement of balls is constrained to rotate on a circular path, a ball retainer holding said balls in spaced apart relation having ball pockets therein, and characterized in that migration of oil under the influence of centrifugal force and gravity is resisted by oil repellant treatment of the end surfaces of said retainer, medially sloping surfaces on the inside of said retainer, and pitched grooves on the outer surface of said retainer.

3. A ball bearing for unidirectional operation of the type wherein a complement of balls is constrained to rotate on a circular track between an inner ball race and an outer ball race, said balls being held in spaced apart relationship by a retainer ring having ball pockets therein, characterized in that said retainer is of a diameter suitable to be guided by said outer race; further characterized in that migration of oil under the influence of centrifugal force and gravity is resisted by oil repellent treatment of the end surfaces of said retainer; conical surfaces on the inside of said retainer, and pitched grooves on the outer surface of said retainer, said grooves being directed toward the ball path in the direction of rotation of said bearing.

4. A bearing ball-retainer ring comprising a piece of metal substantially in the shape of a toroid of pentagonal cross-section, the surfaces of which comprising an outer cylindrical surface, a first substantially plane end surface, a second substantially plane end surface, a first conical inner surface, and a second conical inner surface, said outer surface intersecting said end surfaces to define first and second circles having a first diameter, said first conical surface intersecting said first end surface to define a third circle having a second diameter, said first conical surface also intersecting said second conical surface to define a fourth circle having a third diameter, said second conical surface intersecting said second surface to define a fifth circle having a fourth diameter, said third diameter being less than said first diameter and greater than second and fourth diameters, a plurality of cylindrical ball pocket surfaces having axes which intersect at a point on the axis of said toroid, which axis also is the locus of the centers of said circles, said cylindrical surfaces intersecting with both said outer surface and said fourth circle, said end surfaces being highly polished, said outer surface being modified by spiral grooves, and said sloping surfaces and said outer surface being roughened to a degree sufficient to hold a lubricant.

5. In a ball bearing of the type wherein a complement of balls is constrained to rotate on a circular path, a ball retainer for holding said balls in spaced-apart relation having ball pockets therein, and characterized in that migration of lubricant under the influence of centrifugal force and gravity is resisted by lubricant-repellant treatment of the end surfaces of said retainer, medially sloping surfaces on the inside of said retainer, pitched grooves on the outer surface of said retainer and lubricant-holding roughness on said sloping surfaces and said outer surface.

6. A retainer ring as defined by claim 4 characterized in that said conical surfaces and said outer surface are roughened to an extent just sufficient to hold a film of lubricant.

7. A retainer ring as defined by claim 4 characterized in that said conical surfaces are roughened to an extent just sufficient to hold a film of lubricant.

8. A bearing as defined by claim 5 further restricted in that said bearing is without other means for controlling loss or migration of lubricant.

References Cited by the Examiner
UNITED STATES PATENTS

| | | | |
|---|---|---|---|
| 2,718,440 | 9/55 | Brinkman | 308—235 X |
| 2,779,640 | 1/57 | Jones | 308—201 X |
| 2,975,008 | 3/61 | Ruley | 308—201 |
| 3,096,129 | 7/63 | Hay | 308—201 X |

FOREIGN PATENTS

| | | |
|---|---|---|
| 1,024,497 | 1/53 | France. |

ROBERT C. RIORDAN, Primary Examiner.